(12) United States Patent  
Mrasek

(10) Patent No.: US 7,000,058 B1  
(45) Date of Patent: Feb. 14, 2006

(54) METHOD AND CONFIGURATION FOR TRANSMITTING DIGITAL DATA

(75) Inventor: Armin Mrasek, Schwabsoien (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/398,689

(22) Filed: Sep. 20, 1999

(30) Foreign Application Priority Data

Sep. 18, 1998 (DE) ................................ 198 42 849

(51) Int. Cl.
*G06F 13/36* (2006.01)
*G06F 13/24* (2006.01)

(52) U.S. Cl. ........................ 710/307; 710/310; 710/260
(58) Field of Classification Search ................ 370/364, 370/365, 470, 419; 375/377, 316; 345/535; 365/221, 230.03; 710/310, 107
See application file for complete search history.

(56) References Cited

U.S. PATENT DOCUMENTS

| | | | |
|---|---|---|---|
| 5,046,039 A * | 9/1991 | Ugajin et al. ................. 710/56 |
| 5,386,438 A * | 1/1995 | England ..................... 375/377 |
| 5,506,747 A * | 4/1996 | Bain ..................... 365/230.03 |
| 5,524,007 A * | 6/1996 | White et al. ................. 370/419 |
| 5,673,416 A * | 9/1997 | Chee et al. .................. 345/535 |
| 5,796,961 A * | 8/1998 | O'Brien ...................... 710/107 |
| 5,841,722 A * | 11/1998 | Willenz ....................... 365/221 |
| 5,915,104 A * | 6/1999 | Miller ........................ 710/310 |
| 6,122,717 A * | 9/2000 | Chan et al. ................. 711/170 |

FOREIGN PATENT DOCUMENTS

| | | |
|---|---|---|
| DE | 39 37 021 A1 | 5/1991 |
| EP | 0 272 939 A2 | 6/1988 |
| EP | 0701211 A2 * | 3/1996 |
| JP | 363292747 A * | 11/1988 ................. 375/316 |
| JP | 04051735 A * | 2/1992 |

OTHER PUBLICATIONS

International Patent Application WO 95/06375 (Gat), dated Mar. 2, 1995.
"ISDN layer-2 Protocol Controllers", ICs for communications, PEB 2070, pp. 106-108.

* cited by examiner

*Primary Examiner*—Glenn A. Auve
*Assistant Examiner*—Christopher E. Lee
(74) *Attorney, Agent, or Firm*—Laurence A. Greenberg; Werner H. Stemer; Ralph E. Locher

(57) ABSTRACT

A method for transmitting digital data, which is continued in data frames of variable lengths, from a first data bus to a second data bus, which is operated asynchronously with respect to the first data bus and is controlled by a microprocessor. The method has the below listed steps. The data is written from the first data bus to a memory of a settable size. A memory control unit informs the microprocessor, in the form of an interrupt, when the memory is full or when the end of a data frame is reached. The microprocessor determines from the memory control unit the quantity of data to be read from the memory, reads the data from the memory, and sets the size of the memory. Finally, the microprocessor acknowledges reception of the data block to the memory control unit.

9 Claims, 8 Drawing Sheets

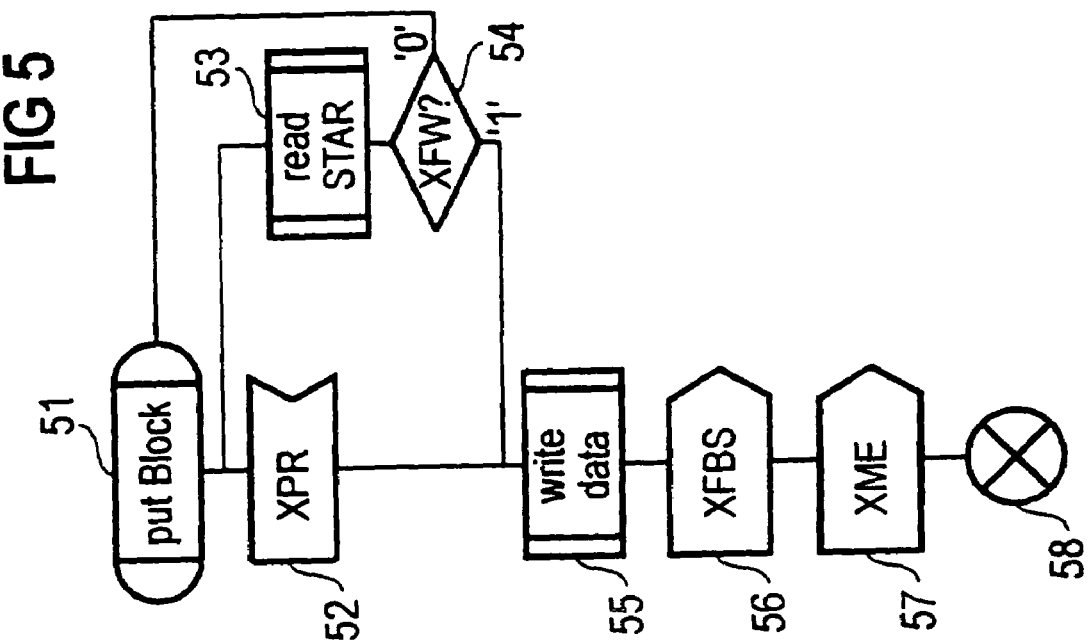
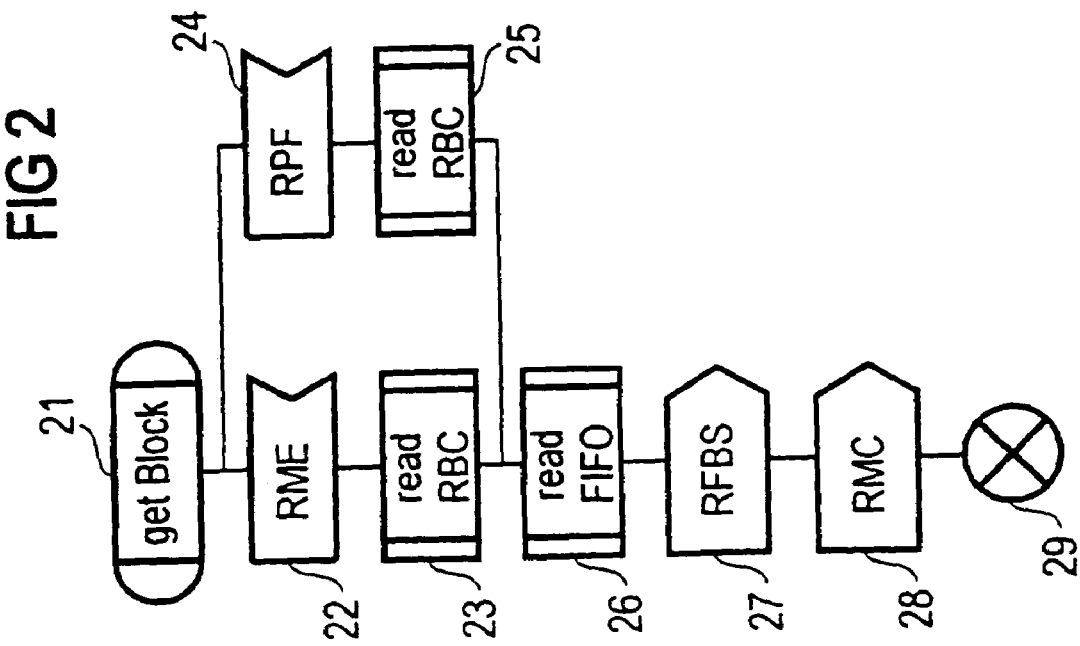

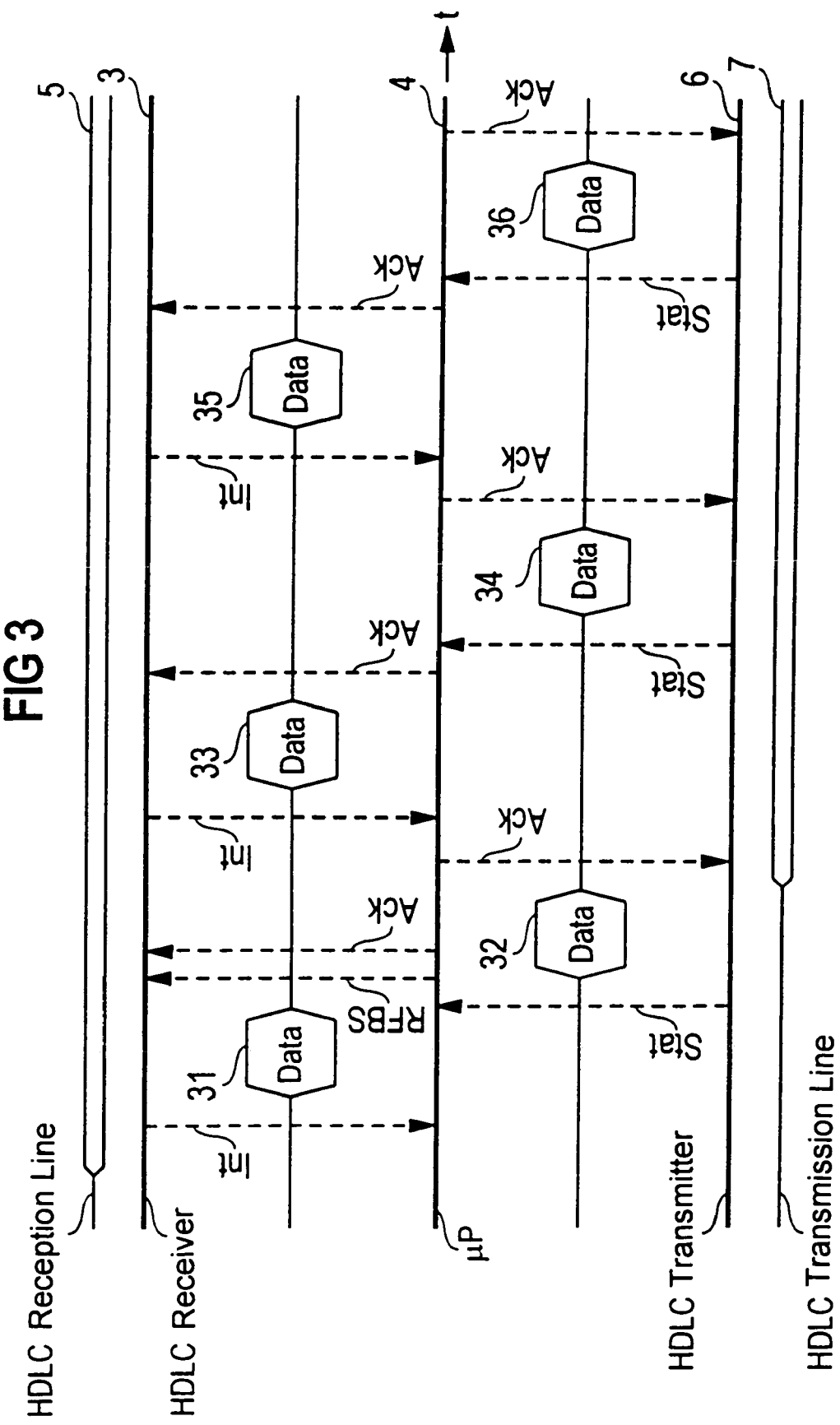

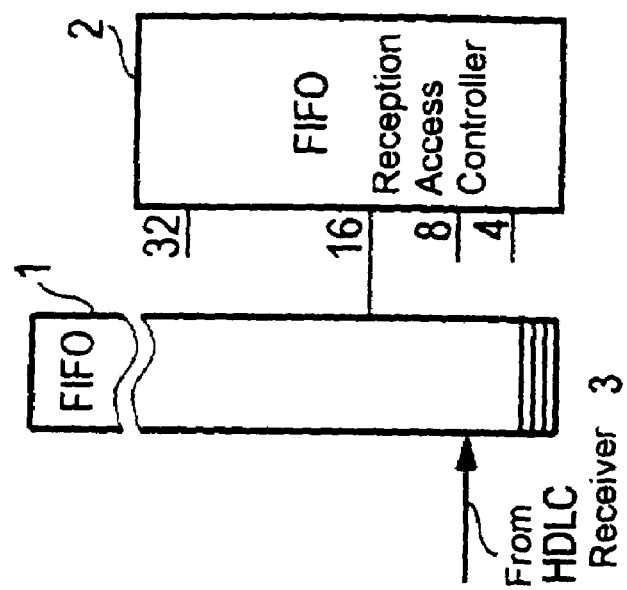
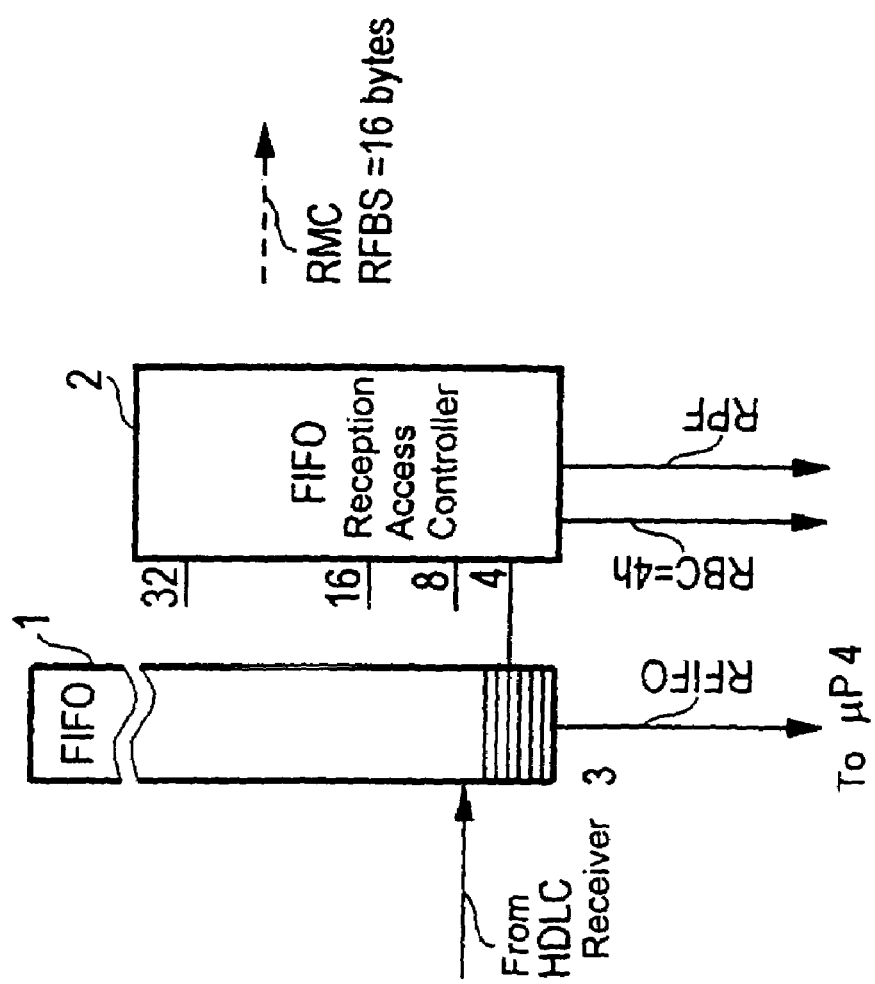

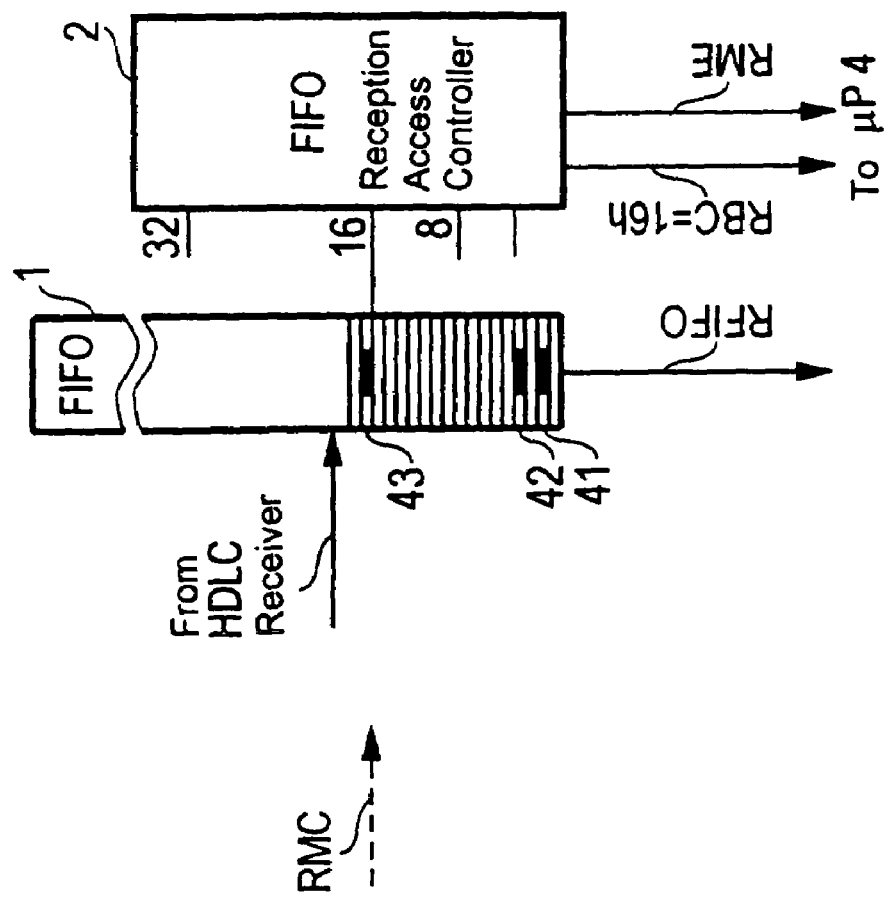
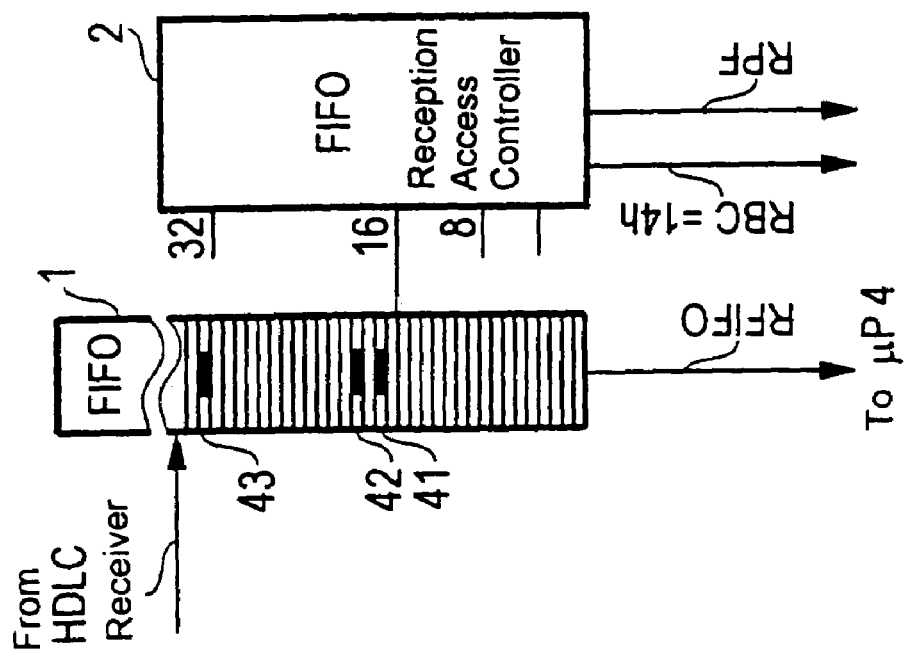

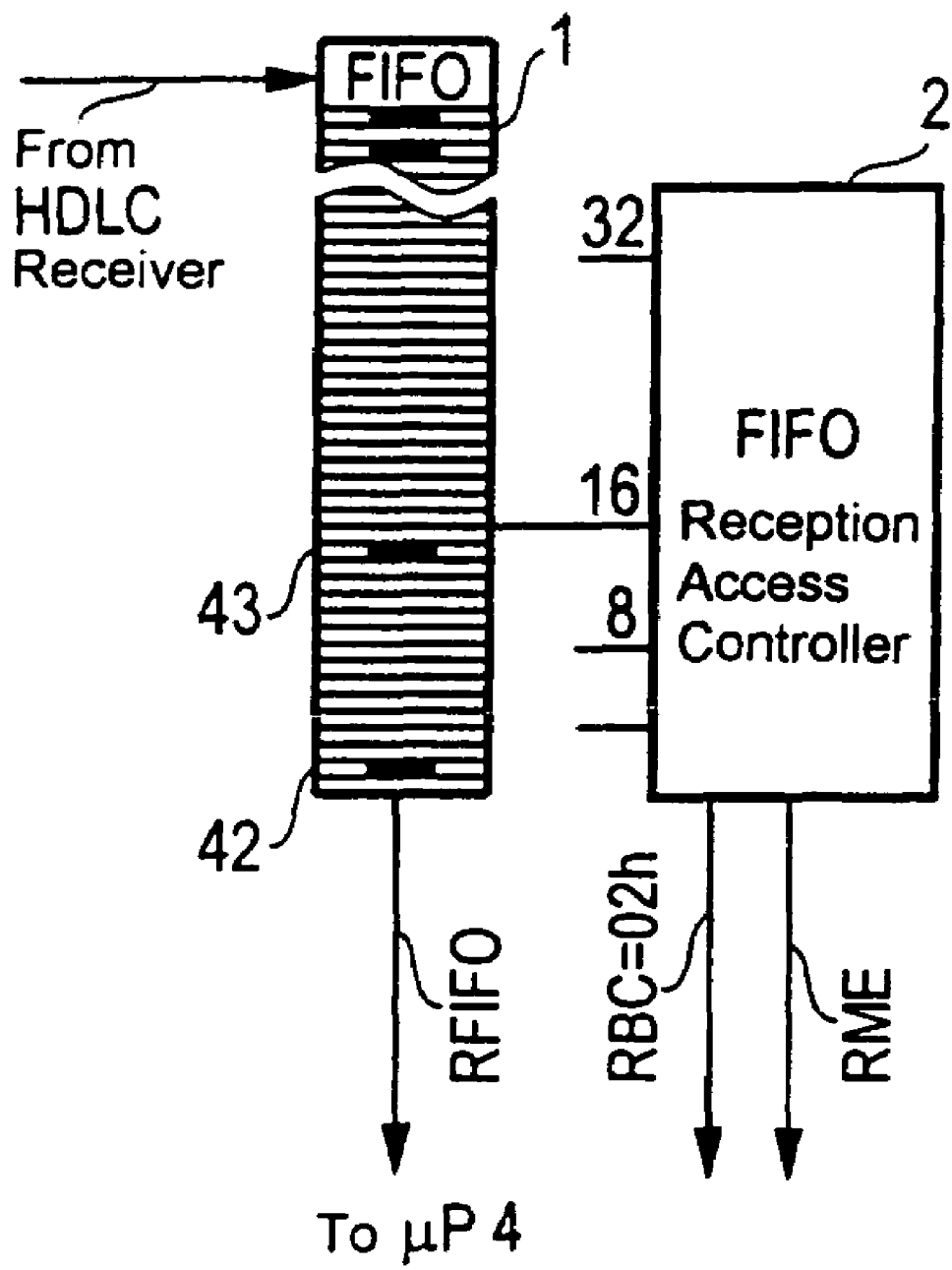

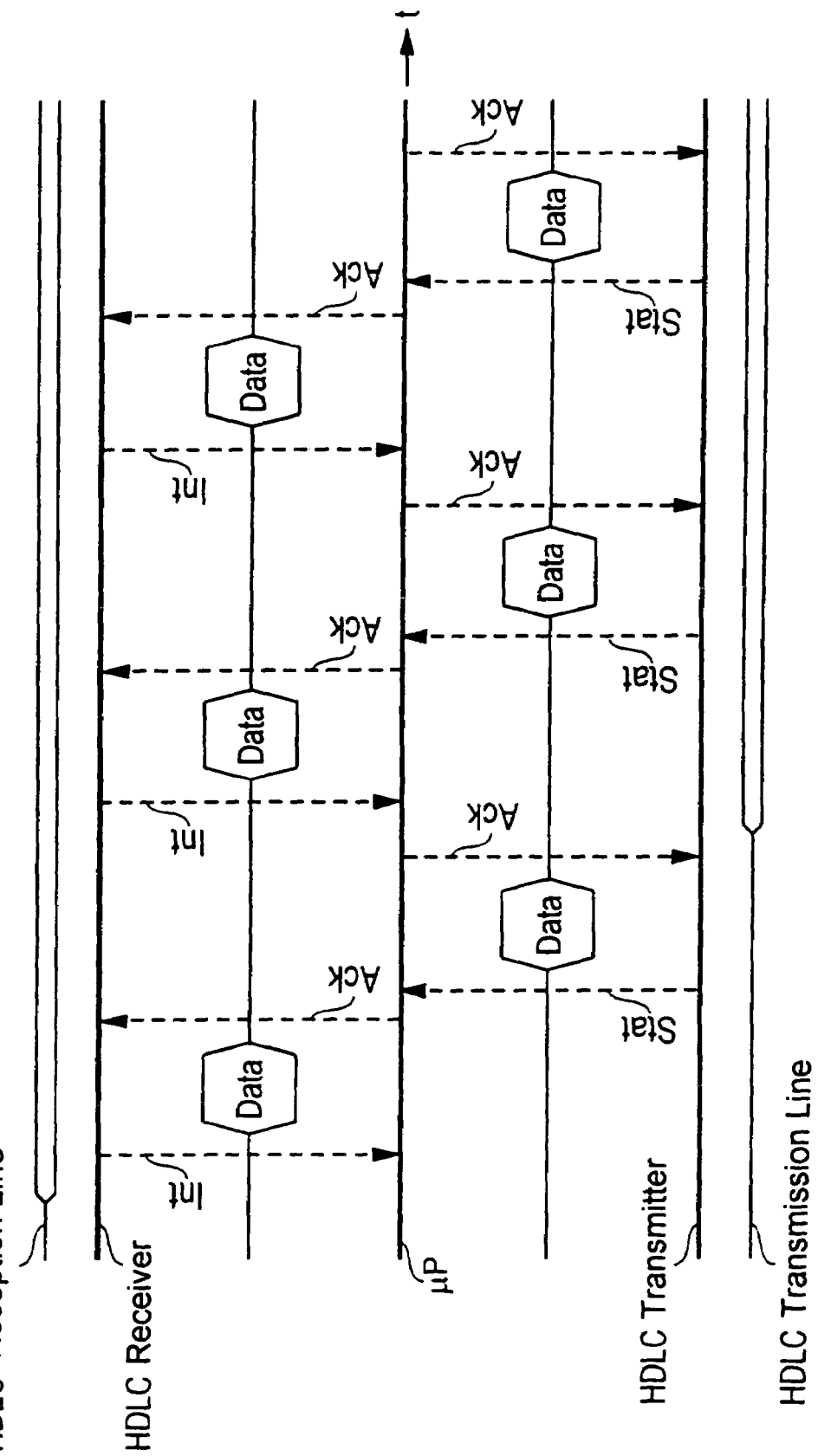

METHOD AND CONFIGURATION FOR TRANSMITTING DIGITAL DATA

BACKGROUND OF THE INVENTION

Field of the Invention

The invention relates to a method and configuration for transmitting digital data, which is divided up into data frames of variable length, from a first data bus to a second data bus and controlled by a microprocessor.

The integrated services digital network (ISDN) provides each subscriber with access to two so-called B channels for communicating with other subscribers, as well as to a so-called D channel in order to interchange signaling for a desired connection with the ISDN. While the ISDN does not ensure any data protection for the subscribers when communicating on the B channels, the ISDN demands for the D channel data protection conforming to the requirements of Layer 2 of the international standardization organization/open systems interconnection (ISO-OSI) layer model. To this end, the high-level data link control (HDLC) protocol is used for the ISDN.

Hence, the terminals and network interface equipment for the ISDN are provided with HDLC control devices which check the data protection information for a received D-channel frame and add protection information to a D-channel frame which is to be transmitted. The applicant markets such control devices under the product name PEB 2070 which is an integrated semiconductor component.

An incoming D-channel signal is supplied to an HDLC receiver logic unit, which checks the protection information for the received D-channel signal. An output signal from the HDLC receiver logic unit is supplied to a first-in first-out (FIFO) memory of a fixed size. A microprocessor removes the data contained in the FIFO memory from the latter in blocks. In the transmission direction, the microprocessor writes data to an FIFO transmission memory in blocks. An HDLC transmission logic unit removes the data contained in the FIFO transmission memory from the latter, adds protection information to a complete D-channel frame and outputs the D-channel signal thus obtained.

SUMMARY OF THE INVENTION

It is accordingly an object of the invention to provide a method and a configuration for transmitting digital data which overcomes the above-mentioned disadvantages of the prior art methods and devices of this general type, in which digital data is transmitted between separate bus systems in an efficient manner.

With the foregoing and other objects in view there is provided, in accordance with the invention, an improved method for transmitting digital data divided up into data frames of variable lengths from a first data bus to a second data bus operated asynchronously with respect to the first data bus and controlled by a microprocessor, the improvement which includes: writing the digital data from the first data bus to a memory having a settable size; informing the microprocessor, in a form of an interrupt generated by a memory control unit, if the memory is full or an end of a data frame has been reached; determining via the microprocessor from the memory control unit a quantity of the digital data to be read from the memory; reading via the microprocessor the digital data from the memory; setting via the microprocessor a size of the memory; and transmitting from the microprocessor to the memory control unit an acknowledgment of a reception of a data block of the digital data.

The method for transmitting the digital data, that is divided up into data frames of variable length, from the first data bus to the second data bus, that is operated asynchronously with respect to the first data bus, is controlled by a microprocessor. The data is written from the first data bus to a memory of a settable size. A memory control unit informs the microprocessor, in the form of an interrupt, when the memory is full or when the end of a data frame is reached. The microprocessor determines from the memory control unit the quantity of data to be read from the memory. The microprocessor reads the data from the memory, sets the size of the memory and acknowledges reception of the data block to the memory control unit.

With the step of setting the size of the memory, the microprocessor is able to set the size of the available data memory. In this case, the memory size is typically set to be small at first in order to be set to the maximum size after the start of a very long data frame is received, while the data frame is still being transmitted. In this way, the microprocessor can transmit an acknowledging D-channel signal to the other subscriber very early and very shortly after the start of the long data frame is received. On the other hand, for accepting the remaining parts of the long data frame, a smaller number of interrupts is triggered in the microprocessor, because the latter has increased the size of the available memory space in the meantime. In this way, the performance of the microprocessor is not restricted and the other subscriber can be assured of short response times.

It is particularly preferable for the data to be supplied, before storage, to the HDLC logic unit, which checks whether the data has been received correctly. This procedure is particularly advantageous in an environment in which the data to be transmitted must comply with the Layer 2 requirements.

Another method for transmitting the digital data from the first data bus, which is controlled by the microprocessor, to the second data bus, which is operated asynchronously with respect to the first data bus has the below listed steps. The data is written from the first data bus to a memory of a settable size. A memory control unit informs the microprocessor, in the form of an interrupt, when the memory is ready to accept new data from the first data bus, or the microprocessor asks the memory control unit whether the memory is ready to accept new data from the first data bus. The microprocessor writes data to the memory, sets the size of the memory and acknowledges the end of the data to the memory control unit. The data is then placed onto the second data bus.

This method can be used to particular advantage for transmitting data from the microprocessor to a data bus that is operated asynchronously with the microprocessor. With this method, too, the microprocessor is burdened by a smaller number of interrupt signals.

It is particularly preferable for the data to be supplied to the HDLC logic unit before it is placed onto the second data bus.

The HDLC logic unit adds error-checking data to the data transmitted by the microprocessor, the error-checking data is evaluated by a receiving HDLC logic unit of a remote connection subscriber.

A configuration for transmitting digital data, which is divided up into data frames of variable length, from a first data bus to a second data bus, which is operated asynchronously with respect to the first data bus and is controlled and read by a microprocessor is disclosed. The configuration has a memory to which the data received from the first data bus is written. In addition, a control device is provided which controls the access operations to the memory by the first data bus and the microprocessor. The configuration is characterized in that the size of the memory is variable. Furthermore, a first register is provided, into which the size of the memory can be entered, and a second register is provided, into which the quantity of data just written to the memory can be entered. The first register is variable in each read cycle of the microprocessor. Such a configuration thus has a memory in which the microprocessor stores an available size in a first register.

A preferred configuration has an HDLC logic unit connected between the first data bus and the memory. Therefore, the configuration is able to receive data provided with HDLC checking information.

Other features which are considered as characteristic for the invention are set forth in the appended claims.

Although the invention is illustrated and described herein as embodied in a method and a configuration for transmitting digital data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is flowchart for a microprocessor routine for fetching a data block from a reception memory;

FIG. 3 is a timing diagram of signals between the microprocessor and an HDLC transmission and reception configuration;

FIGS. 4a to 4e are block diagrams explaning how the invention works;

FIG. 5 is a flowchart for the microprocessor routine for writing data to a transmission memory; and FIGS. 6a and 6b are timing diagrams of signal transmissions between the microprocessor and the HDLC transmitter and receiver according to the prior art.

DESCRIPTION OF THE PREFERRED EMBODIMENTS

Figure 6B:
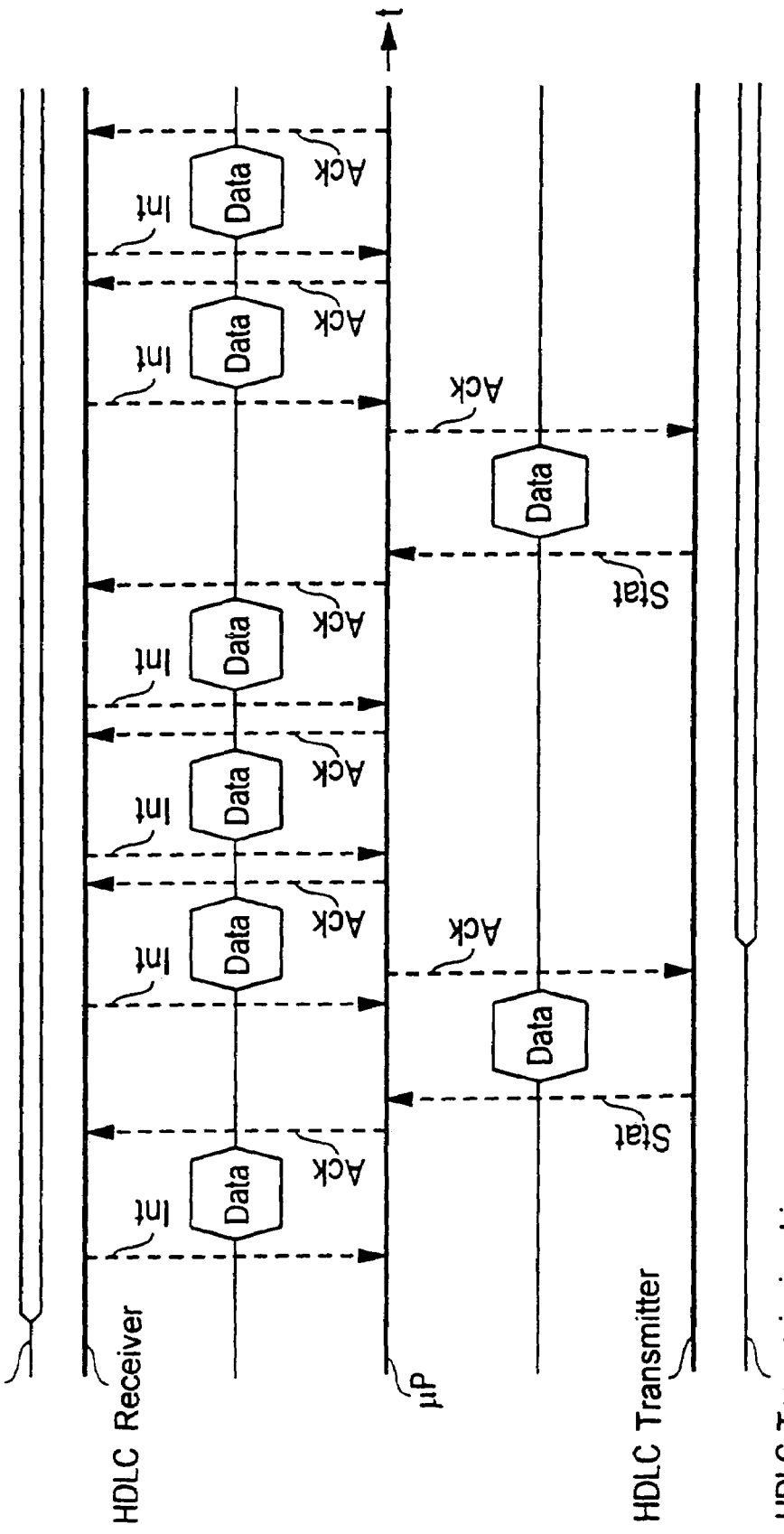

In all the figures of the drawing, sub-features and integral parts that correspond to one another bear the same reference symbol in each case. Referring now to the figures of the drawing in detail and first, particularly, to FIGS. 6a and 6b thereof, there are shown the fundamental procedures for transmitting and receiving data according to the prior art. FIGS. 6a and 6b show the timing of signals between an HDLC reception line, an HDLC receiver having an FIFO receiver memory, a microprocessor, an HDLC transmitter having an FIFO transmission memory, and an HDLC transmission line. When the HDLC reception line receives data, it is firstly written to the FIFO reception memory. When the end of a D-channel frame is received and placed into the FIFO reception memory or when the FIFO reception memory is full, the HDLC receiver transmits an interrupt signal to a microprocessor. The microprocessor then reads the data written to the FIFO reception memory and acknowledges the procedure to the HDLC receiver by a signal Ack. The microprocessor evaluates the received D-channel signal and compiles a D-channel response signal that is to be transmitted. The microprocessor uses a signal Stat output by the HDLC transmitter to make sure that the FIFO transmission memory is ready to accept data. The microprocessor then writes the D-channel response signal to the FIFO transmission memory. The microprocessor acknowledges to the HDLC transmitter that the data is complete by the signal Ack. The HDLC transmitter then passes the D-channel response signal to the HDLC transmission line.

FIGS. 6a and 6b show the succession of the reception and transmission procedures over time. In FIG. 6a, a large FIFO reception memory is provided. The HDLC receiver always triggers an interrupt Int in the microprocessor if either the FIFO reception memory is full or if the received D-channel signals contain a byte indicating a frame end. The length of a D-channel frame varies and, depending on the signaling, can be longer or shorter than the capacity of the FIFO reception memory. FIGS. 6a and 6b show the case of a very long D-channel frame that is a multiplicity of times larger than the capacity of the FIFO reception memory. In this case, the interrupt Int does not prompt the microprocessor to accept the data from the FIFO reception memory until the FIFO reception memory is full. Since the microprocessor cannot produce a response signal until after it has read the data from the FIFO reception memory, it takes the full length of reading the entire FIFO reception memory until the microprocessor can write response data to the FIFO transmission memory.

The long response time of the microprocessor in such situations can cause problems in certain subscriber connections. This is particularly the case for data connections between the subscribers. The reception of D-channel signaling from a first subscriber by a second subscriber must in this case be acknowledged to the first subscriber within a predetermined time. If the permissible response time is exceeded, faults arise with regard to the connection being made. To eliminate this problem, one solution is to reduce the size of the FIFO reception memory. Since this results in the FIFO reception memory becoming full at shorter intervals, the microprocessor is informed correspondingly earlier about the reception of a time-critical D-channel signal. The permissible response time can then be fulfilled. A significant disadvantage of this solution, however, is that the power of the microprocessor is reduced by the higher number of interrupt signals.

Figure 1:
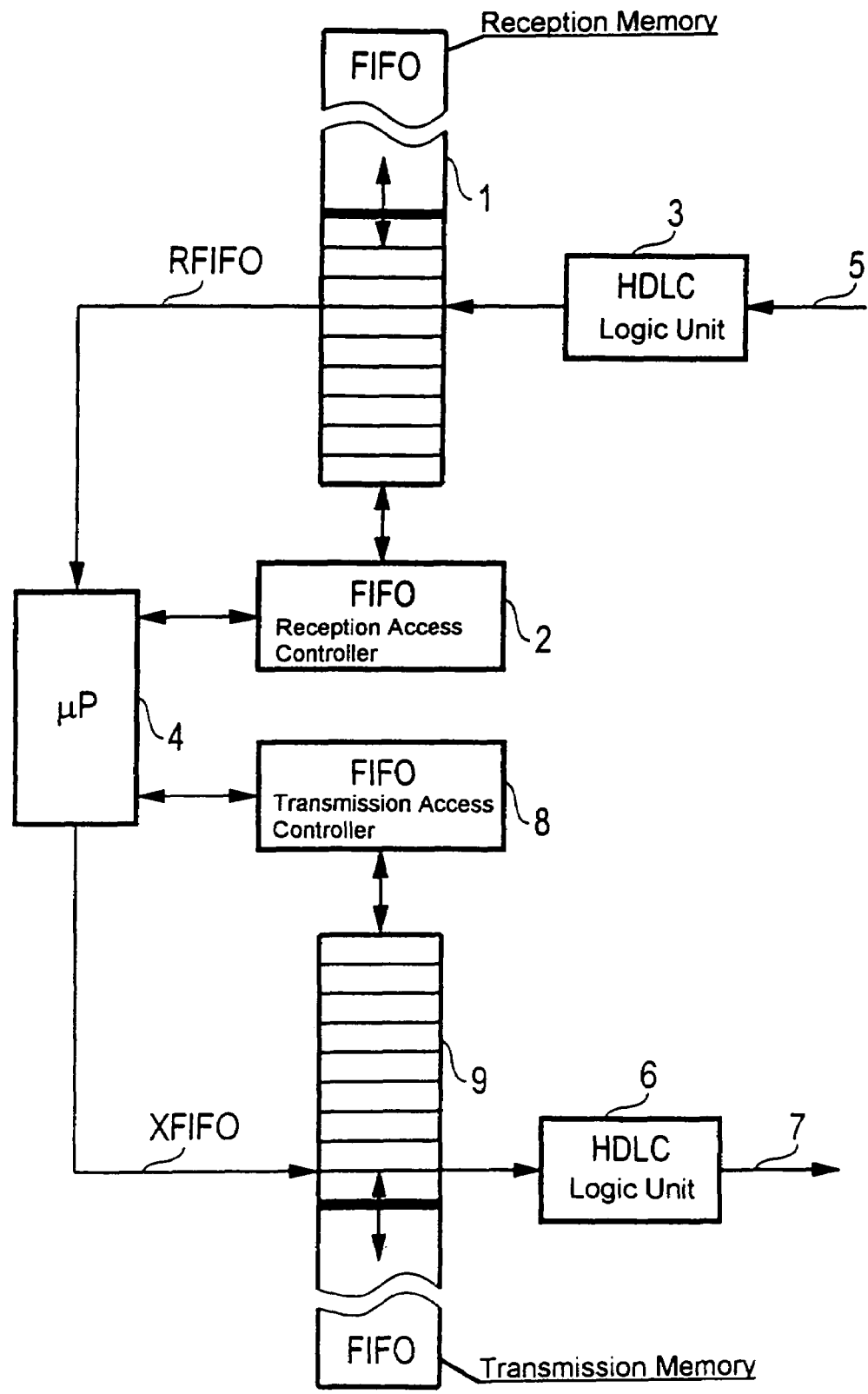
FIG. 1 is a diagrammatic, block diagram of a configuration for transmitting and receiving data according to the invention.

This disadvantage is solved according to the invention of the instant application and reference is now made to FIG. 1. In FIG. 1 there is shown a microprocessor 4 which receives D-channel signals from a line 5 via a line RFIFO, a reception memory 1 in the form of an FIFO, and an HDLC reception logic unit 3. In an opposite direction, the microprocessor 4 transmits D-channel signals to a line 7 via a line XFIFO, a transmission memory 9 in the form of an FIFO, and an HDLC transmission logic unit 6. The configuration is part of an ISDN circuit that transmits and receives B-channel signals and D-channel signals from an ISDN interface, such as an S or T interface, the microprocessor 4 controlling the reception, further processing and the transmission of the data. The configuration shown in FIG. 1 is used for transmitting and receiving D-channel signals which are subject to an HDLC protocol on the basis of the requirements of the ISDN. Since both the reception line 5 and the transmission line 7 are operated independently of the microprocessor 4, the reception and transmission directions are each provided with a buffer which can temporarily store the data just received until it is further processed by the microprocessor 4, or to which the microprocessor 4 can write data to be placed onto the transmission line 7 at a suitable instant.

In the reception direction, the reception memory 1 has the HDLC reception logic unit 3 connected upstream of it, which executes the HDLC protocol in the reception direction. In the transmission direction, the transmission memory 9 has the HDLC transmission logic unit 6 connected downstream of it, which executes the HDLC protocol in the transmission direction. The access operations to the reception memory 1 and to the transmission memory 9 are controlled by a reception access controller 2 and a transmission access controller 8, respectively. The reception access controller 2 interchanges signals with the reception memory 1 and the microprocessor 4. The transmission access controller 8 interchanges signals with the transmission memory 9 and the microprocessor 4.

The reception memory 1 and the transmission memory 9 are each memory areas of a RAM. The reception memory 1 and the transmission memory 9 are operated by the reception access controller 2 and the transmission access controller 8, respectively, as FIFO memories. In this case, the size of the reception FIFO in the reception memory 1 and the size of the transmission FIFO in the transmission memory 9 can each be set.

In FIG. 2, 21 denotes the start of a microprocessor routine "Get Block", which the microprocessor 4 uses to read data from the reception memory 1. In steps 22 and 24, a respective interrupt is triggered in the microprocessor 4 by the reception access controller 2. The interrupt RME (Receive Message End) in step 22 is triggered when the reception memory 1 contains an entry indicating the end of a data frame during the D-channel transmission. The interrupt RPF (Receive Pool Full) in step 24 indicates that the data written to the reception FIFO has reached the current size of the reception FIFO. After step 22, the register RBC (Receive Block Count) is read in step 23, the register RBC containing a number of data items to be read by the microprocessor 4 from the reception FIFO. In the case of step 23, this corresponds to the position of the oldest data byte received which indicates the end of a data frame. In the alternative case, step 24 is followed by a step 25, in which, similarly, the register RBC is read. In this case, the register RBC contains the current size of the reception FIFO.

In step 26, the microprocessor 4 reads from the FIFO to the extent indicated by the value read from the register RBC. In the case of an interrupt RME, the microprocessor 4 therefore reads all the bytes up to and including the byte that indicates the frame end.

In the case of the interrupt RPF, the microprocessor 4 reads all the bytes from the reception FIFO. After the data has been read, the size of the reception FIFO available for further data reception in the reception memory 1 is written to a register RFBS (Receive FIFO Block Size) in the reception access controller 2 by the microprocessor 4 in a step 27. In a subsequent step 28, the microprocessor 4 acknowledges to the reception access controller 2 that the data has been received. This is done with the signal RMC (Receive Message Complete). The microprocessor routine in FIG. 2 ends with the step 29.

FIG. 3 shows the timing of the signals between the HDLC receiver 3 and the microprocessor 4 for receiving data. Firstly, the HDLC receiver 3 triggers the interrupt Int in the microprocessor 4. In the case shown in FIG. 3, a very small FIFO size is set, so that an interrupt is triggered in the form of the RPF (Receive Pool Full) shown in the step 24. After the microprocessor 4 has determined, in the step 25, the data quantity to be read, it reads the data 31 from the receiver FIFO of the HDLC receiver 3. The microprocessor 4 processes the received data 31, which in the example given represents the start of a D-channel frame, and produces a response signal which is intended to be transmitted to the remote subscriber. To this end, the microprocessor 4 determines a status of the HDLC transmitter 6 as a result of the latter transmitting the signal Stat to the microprocessor 4. The HDLC transmitter 6 thus indicates that it is ready to receive data from the microprocessor 4. The microprocessor 4 transmits prepared response data 32 to the HDLC transmitter and acknowledges the transmitted data 32 to the HDLC transmitter 6 by the signal Ack. The HDLC transmitter 6 then passes the transmission data 32 to the HDLC transmission line 7.

After the microprocessor 4 has received the relatively small data quantity 31 in a long D-channel frame from the HDLC receiver 3, the microprocessor 4 orders the HDLC receiver 3 to change the size of the receiver FIFO. To this end, the microprocessor 4 transmits the new value for the size of the receiver FIFO via the signal RFBS. In the case shown in FIG. 3, the size of the receiver FIFO is set to the maximum size of 32 bytes. After the microprocessor 4 has transmitted the signal RFBS, it acknowledges reception of the data 31 by the signal Ack, which is shown in FIG. 2 by the signal RMC in step 28.

In the further course of events, the HDLC receiver 3 transmits a further interrupt signal Int in the form RPF in order to indicate that the receiver FIFO is full again. The microprocessor 4 reads data 33 contained in the receiver FIFO and acknowledges that the data 33 has been read by the signal Ack in the form RMC. After accepting the data 33, the microprocessor 4 has skipped step 27 in FIG. 2 because no change is to be made to the size of the receiver FIFO, which has just been set.

On the basis of the data already received, the microprocessor 4 decides whether or not the size of the receiver FIFO needs to be changed. Typically, after a relatively long pause at the receiver end, the microprocessor 4 will set the size of the receiver FIFO to a minimum value. This ensures that, irrespective of whether the next D-channel frame received is very long or very short, an early response can be output to the remote subscriber in every case. When the first bytes of a D-channel frame have reached the microprocessor 4 (the length of the D-channel frame is contained in the first bytes of the frame), the microprocessor 4 sets the size of the receiver FIFO to a maximum size. This ensures that the remaining data in the long D-channel frame can be passed to the microprocessor 4 with as small a number of interrupt signals as possible. This is shown in FIG. 3 with the received data blocks 33 and 35. At the transmission end, the microprocessor 4 transmits large data blocks 34 and 36 to the HDLC transmitter 6.

FIGS. 4a to 4e illustrate the interaction of the reception memory 1 with the reception access controller 2 and the interchange of signals with the microprocessor 4. In FIG. 4a, a size of 4 bytes is set for the receiver FIFO. The data received from the HDLC receiver 3 exceeds this limit, so that the reception access controller 2 triggers an interrupt in the form of the signal RPF in the microprocessor 4. The microprocessor 4 reads the four bytes from the full receiver FIFO and transmits firstly the signal RFBS=16 bytes and then the signal RMC (Receive Message Complete) to the receiver access controller 2 (shown by a dashed arrow between FIGS. 4a and 4b).

The HDLC receiver 3 writes further data to the reception memory 1, so that the latter is again filled to the size of 16 bytes now set for the receiver FIFO. As shown in FIG. 4c, the reception access controller 2 again triggers an interrupt RPF in the microprocessor 4. The microprocessor 4 reads the 16 bytes from the receiver FIFO and acknowledges reception of the data to the reception access controller 2 by the signal RMC (shown by a dashed arrow between FIGS. 4c and 4d).

Within the size of the receiver FIFO, which has been set unchanged at 16 bytes, there are now frame end bytes 41, 42 and 43 (see FIG. 4d). The frame end bytes 41, 42 and 43 each indicate the end of a D-channel frame. The reception access controller 2 recognizes the presence of the frame end byte 41, which was received first, within the size of the receiver FIFO of 16 bytes (which is still effective) and triggers an interrupt in the microprocessor 4 by the signal RME (Receive Message End). After reception of the D-channel frame, the end of which is indicated by the frame end byte 41, the reception access controller 2 triggers a further interrupt RME in the microprocessor 4 on account of the frame end byte 42 which is now present. The latter is shown in FIG. 4e.

FIG. 5 shows a microprocessor routine for writing data to the transmission FIFO. The routine starts with step 51. In step 52, the transmission access controller 8 informs the microprocessor 4, via an interrupt XPR (Transmit Pool Ready), that the transmission FIFO is ready to accept new data. Alternatively, the microprocessor 4 can read the status register STAR in step 53 of its own accord in order to check the write authorization by a bit XFW (Transmit FIFO Write). If the bit XFW is set to 0, then it is not yet possible for any further data to be written, and the routine branches back to the start 51. The set bit XFW=1 indicates that write authorization exists.

Both in the case of the interrupt XPR in step 52 and in the case of the set bit XFW in step 54, the microprocessor 4 next writes, in step 55, data to the transmission FIFO. In step 56, the microprocessor 4 can set the size of the transmission FIFO by writing to a register XFBS (Transmit FIFO Block Size) accordingly. Step 56, and step 27 in FIG. 2 in the reception direction, are optional and can be skipped. In step 57, the microprocessor acknowledges to the transmission access controller 8 that data has been transmitted to the transmission FIFO by a signal XME (Transmit Message End). The microprocessor routine in FIG. 5 ends with step 58.

In a similar way to in the reception direction, the size of the transmission FIFO can also be shown in the transmission direction. This enables the size of the transmission FIFO to be optimized depending on the size of the D-channel frames to be transmitted. In this way, the number of triggered interrupts XPR in step 52 and the number of necessary checks for the bit XFW in step 54 can be minimized. This further reduces the load on the microprocessor 4.

A large number of interrupts results in a high degree of processing complexity for the microprocessor 4 because, when an interrupt is received, the current processing status of the microprocessor 4 needs to be saved in order to be able to continue at this point after the interrupt has been processed. Since the interrupts RME and RPF, which are triggered by the reception of D-channel data, have high priority, a large number of such interrupts puts a strain on the performance of the microprocessor 4, which has to handle a multiplicity of other tasks in addition to D-channel processing. The invention allows the size of the receiver FIFO and of the transmission FIFO to be optimized depending on the size of the D-channel frames received and of the D-channel frames that are to be transmitted, respectively. The number of triggered interrupts RPF, RME or XPR can thus be reduced to a necessary minimum. At the same time, the invention ensures that the requirements of short response times after reception of the start of a D-channel frame are fulfilled by temporarily setting an appropriately small size for the receiver FIFO.

What is claimed is:

1. An improved ISDN-data transmission method for transmitting digital data divided up into HDLC data frames of variable lengths from a first data bus to a second data bus operated asynchronously with respect to the first data bus and controlled by a microprocessor, the improvement which comprises:

writing the digital data of a given HDLC-data frame from the first data bus to a memory having a settable size, said memory being arranged directly between said first data bus and said second data bus;

informing the microprocessor, in a form of an interrupt signal generated by a memory control unit, if the memory is full or if the memory contains an entry indicating an end of a respective HDLC-data frame;

determining via the microprocessor from the memory control unit a quantity of the digital data to be read from the memory;

reading via the microprocessor the digital data from the memory;

setting dynamically via the microprocessor a size of the memory for a current reading/writing procedure of said memory;

storing in a register, for a following writing procedure, a present size of memory, the register having a content selectively modifiable with each read cycle of the microprocessor; and transmitting from the microprocessor to the memory control unit an acknowledgment of a reception of the data being read out from the memory.

2. The method according to claim 1, which comprises supplying the digital data from the first data bus to a high-level data link control logic unit which checks whether the digital data has been received correctly before the digital data is written to the memory.

3. The method according to claim 1, wherein the memory comprises a FIFO.

4. An improved ISDN-data transmission method for transmitting digital data divided up into HDLC data frames of variable lengths from a first data bus, controlled by a microprocessor, to a second data bus operated asynchronously with respect to the first data bus, the improvement which comprises:

writing the digital data from the first data bus to a memory having a settable size, said memory being arranged directly between said first data bus and said second data bus;

performing one of informing the microprocessor, in a form of an interrupt generated by a memory control unit, if the memory is ready to accept new data from the first data bus, and the microprocessor asking the memory control unit if the memory is ready to accept the new data from the first data bus;

writing via the microprocessor the new data to the memory;

setting dynamically via the microprocessor a size of the memory for a following reading/writing procedure of said memory, the settable size being dependent on the size of said transmitted HDLC-data frame being written at the same time in said memory;

storing in a register, for a following writing procedure, a present size of memory, the register having a content selectively modifiable with each read cycle of the microprocessor;

transmitting from the microprocessor to the memory control unit an acknowledgment of the data being written into the memory; and placing the new data onto the second data bus.

5. The method according to claim 4, which comprises supplying the new data to a high-level data link control logic unit before it is placed onto the second data bus, the high-level data link control logic unit adding error-checking data to the new data.

6. The method according to claim 4, wherein the memory comprises a FIFO.

7. A configuration for performing an ISDN-data transmission method for transmitting digital data divided up into HDLC data frames of variable length from a first data bus to a second data bus operated asynchronously with respect to the first data bus and controlled by a microprocessor, the configuration comprising:

a memory having a settable size for storing data received from the first data bus and for subsequently reading out by the microprocessor, said memory being arranged directly between said first data bus and said second data bus, the settable size being dependent on the size of said transmitted HDLC-data frame being written at the same time in said memory;

a control device for controlling access operations to said memory by the first data bus and the microprocessor;

a first register storing an amount of the data being currently written in the memory and currently read out by the microprocessor; and a second register storing, for a following writing procedure, a present size of memory, said second register having a content selectively modifiable with each read cycle of the microprocessor.

8. The configuration according to claim 7, including a high-level data link control HDLC logic unit connected between the first data bus and said memory.

9. The configuration according to claim 7, wherein the memory comprises a FIFO.

* * * * *